United States Patent [19]
Cloeren

[11] Patent Number: 5,066,443
[45] Date of Patent: Nov. 19, 1991

[54] DUAL BARRIER LAMINATE PROCESS

[75] Inventor: Peter F. Cloeren, Orange, Tex.

[73] Assignee: P.C.E. Corp., Orange, Tex.

[21] Appl. No.: 507,633

[22] Filed: Apr. 11, 1990

[51] Int. Cl.$^5$ .............................................. B29C 47/06
[52] U.S. Cl. ..................................... 264/171; 264/37; 425/131.1
[58] Field of Search ................. 264/171, 173, 514, 37; 425/131.1, 133.1, 133.5

[56] References Cited

U.S. PATENT DOCUMENTS

| | | | |
|---|---|---|---|
| 4,144,011 | 3/1979 | Sponaugle | 425/133.5 |
| 4,197,069 | 4/1980 | Cloeren | 425/131.1 |
| 4,226,822 | 10/1980 | Yoshikawa et al. | 425/133.1 |
| 4,289,560 | 9/1981 | Simons | 425/131.1 |
| 4,410,602 | 10/1983 | Komoda et al. | 425/462 |
| 4,522,775 | 6/1985 | Briggs et al. | 264/514 |
| 4,533,308 | 8/1985 | Cloeren | 425/131.1 |
| 4,533,510 | 8/1985 | Nissel | 425/462 |
| 4,780,258 | 10/1988 | Cloeren | 264/171 |
| 4,808,482 | 2/1989 | Benge et al. | 264/37 |
| 4,839,131 | 6/1989 | Cloeren | 425/462 |

FOREIGN PATENT DOCUMENTS 3405744  8/1985  Fed. Rep. of Germany ...... 425/462

Primary Examiner—Jeffery Thurlow
Attorney, Agent, or Firm—Timothy R. Kroboth

[57] ABSTRACT

The present invention provides a novel process for the coextrusion of a laminate containing more than a single barrier layer. The process overcomes the interfacial instability associated with thinning and spreading a composite stream containing a barrier layer of EVOH. Furthermore, the process prevents migration of EVOH particles from regrind.

18 Claims, 3 Drawing Sheets

DUAL BARRIER LAMINATE PROCESS

BACKGROUND OF THE INVENTION

This invention relates to coextrusion, particularly of a laminate having multiple barrier layers.

As illustrated by U.S. Pat. Nos. 4,197,069 and 4,533,308 to Cloeren, an extrusion apparatus having a vane blade between flow channels, is known. The vane blade provides for stream convergence at substantially equal flow velocities. As exemplified by U.S. Pat. No. 4,780,258 to the inventor, also known is an extrusion apparatus and process useful for coextruding a laminate containing more than a single barrier layer.

In the packaging industry, a layered sheet or film having a single barrier layer of, for example, ethylene vinyl alcohol polymer is widely used. This copolymer is commonly known as EVOH. A commercially available EVOH copolymer contains about 40 mole per cent ethylene and about 60 mole percent vinyl alcohol.

A barrier layer serves as a barrier to gases such as oxygen. In the food packaging industry, a barrier layer prolongs freshness and shelf-life, and retains aroma. However, imperfections in a barrier layer will interrupt the integrity of the barrier.

In using coextruded sheet, as for instance in forming containers, considerable scrap is produced. For economic reasons, it is desirable to recycle the scrap. As the percentage of scrap within a coextruded sheet increases, production of the sheet becomes relatively more cost-effective. It is therefore highly advantageous to be able to include within a sheet a high percentage of scrap, say about 30-65%, of the total volume.

Difficulty has been encountered in using scrap containing EVOH and polypropylene, a commonly used skin layer material, which is a good barrier to moisture.

When EVOH and polypropylene are used as the barrier and skin layer materials, respectively, of a coextruded sheet, and when the barrier material stream is disposed between a stream providing a high percentage of regrind, that is, scrap, to the resultant sheet, and the skin layer material stream, an interfacial instability in the form of an undesirable wavy pattern may be observed at the barrier material interface closer to the skin layer material stream.

This pattern may be eliminated by dividing the regrind stream into portions and disposing one portion next to the polypropylene stream. Using the regrind as a wall-contacting stream within an extrusion apparatus has been found to be additionally beneficial. Nevertheless, a surface flaw known as the applesauce or sandpaper effect, may be observed in the coextruded sheet.

Furthermore, organoleptic contamination by the regrind should be prevented, particularly when the coextruded sheet is used as a food packaging material.

Therefore, there is a need for an improved coextrusion process that is able to provide a coextruded laminate having a barrier layer and containing a high percentage of regrind, that is, at least about 30 to 35% of the total volume. Advantageously, such an improved coextrusion process would overcome the interfacial instability associated with an EVOH barrier layer and the applesauce effect. Beneficially, such an improved coextrusion process would also prevent organoleptic contamination by the regrind.

SUMMARY OF THE INVENTION

It is accordingly an object of the present invention to provide an improved coextrusion process that is able to provide a coextruded laminate having a barrier layer and containing a high percentage of regrind.

It is a further object of the present invention to provide an improved coextrusion process that overcomes the interfacial instability associated with an EVOH barrier layer.

It is a still further object to provide an improved coextrusion process that overcomes the applesauce effect.

It is an even further object to provide an improved coextrusion process that prevents organoleptic contamination by the regrind.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided an improved coextrusion process in which a first barrier material stream is converged with a first regrind stream, and the first barrier material stream is converged with a first skin layer-forming stream to form a first composite stream having the barrier material stream disposed between a first protective stream that includes the regrind stream, and a second protective stream that includes the first skin layer-forming stream. The first protective stream and second protective stream each are of sufficient thickness to overcome interfacial instability of the first barrier material stream during thinning and spreading of the first composite stream. The first protective stream has an exposed face.

In the process, a second barrier material stream is converged with a second regrind stream and the second barrier material stream is converged with a second skin layer-forming stream to form a second composite stream having the second barrier material stream disposed between a third protective stream that includes such regrind stream, and a fourth protective stream that includes the second skin layer-forming stream. The third protective and fourth protective streams each are of sufficient thickness to overcome interfacial instability of the second barrier material stream during thinning and spreading of the second composite stream. The third protective stream has an exposed face.

Thereafter, the first composite stream is thinned and spread, and the second composite stream is thinned and spread. Afterwards, the exposed face of the first protective stream of the first composite stream is converged with the exposed face of the third protective stream of the second composite stream to form a third composite stream having the regrind streams disposed between the first and second barrier material streams, and in which the regrind streams are separated from the first and second skin layer-forming streams.

In the detailed description of the invention that follows, there is essentially described only a preferred embodiment of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

DETAILED DESCRIPTION OF THE INVENTION

The present invention is directed to a novel coextrusion process that is able to provide a coextruded laminate having a barrier layer and containing a high percentage of regrind. Advantageously, this coextrusion process overcomes the interfacial instability associated with an EVOH barrier layer and the applesauce effect. Beneficially, this coextrusion process prevents organoleptic contamination by the regrind. This process may be used for making a coextruded composite useful for forming containers, or otherwise useful as a packaging material such as for packaging food.

Interfacial instability is believed to be caused by a stream of relatively higher viscosity than a skin layer-forming stream, being disposed in a high shear region of a melt-laminate during spreading and thinning of the melt-laminate. Thus, for instance, in the case of a melt-laminate including a regrind stream of about 30 to 65% of the melt-laminate thickness centrally disposed within the melt-laminate, and an EVOH stream located between the regrind stream and a skin layer-forming stream of polypropylene, the EVOH stream will be within the prohibited high shear region, thereby resulting in excessive shear stress on the barrier stream interface closer to the polypropylene.

The applesauce effect, which is observed as a ripple effect, is believed to be caused by location of a regrind stream containing a polypropylene matrix, adjacent to a skin layer-forming stream of polypropylene, and the migration of free-floating particles of EVOH from the regrind matrix into the regrind stream/skin layer-forming stream interface and through such interface. The particle migration and consequent interfacial interruption, is believed to be due to likeness of the chemical construction of the adjacent streams, and resulting lack of recognition by the EVOH of the interfacial boundary. The occurrence and extent of the applesauce effect is time and temperature dependent.

As can be understood, the invention is intended for use with synthetic resins or liquid crystalline polymers useful as barrier materials. Exemplary barrier materials include polymers such as EVOH, polyvinyl alcohol, polyvinylidene chloride, acrylonitrile, polyamide, and copolymers thereof. Some of these barrier materials are thermally unstable or heat-sensitive, and therefore residence time in a coextrusion apparatus should be limited; otherwise, degradation is accelerated.

Figure 1:
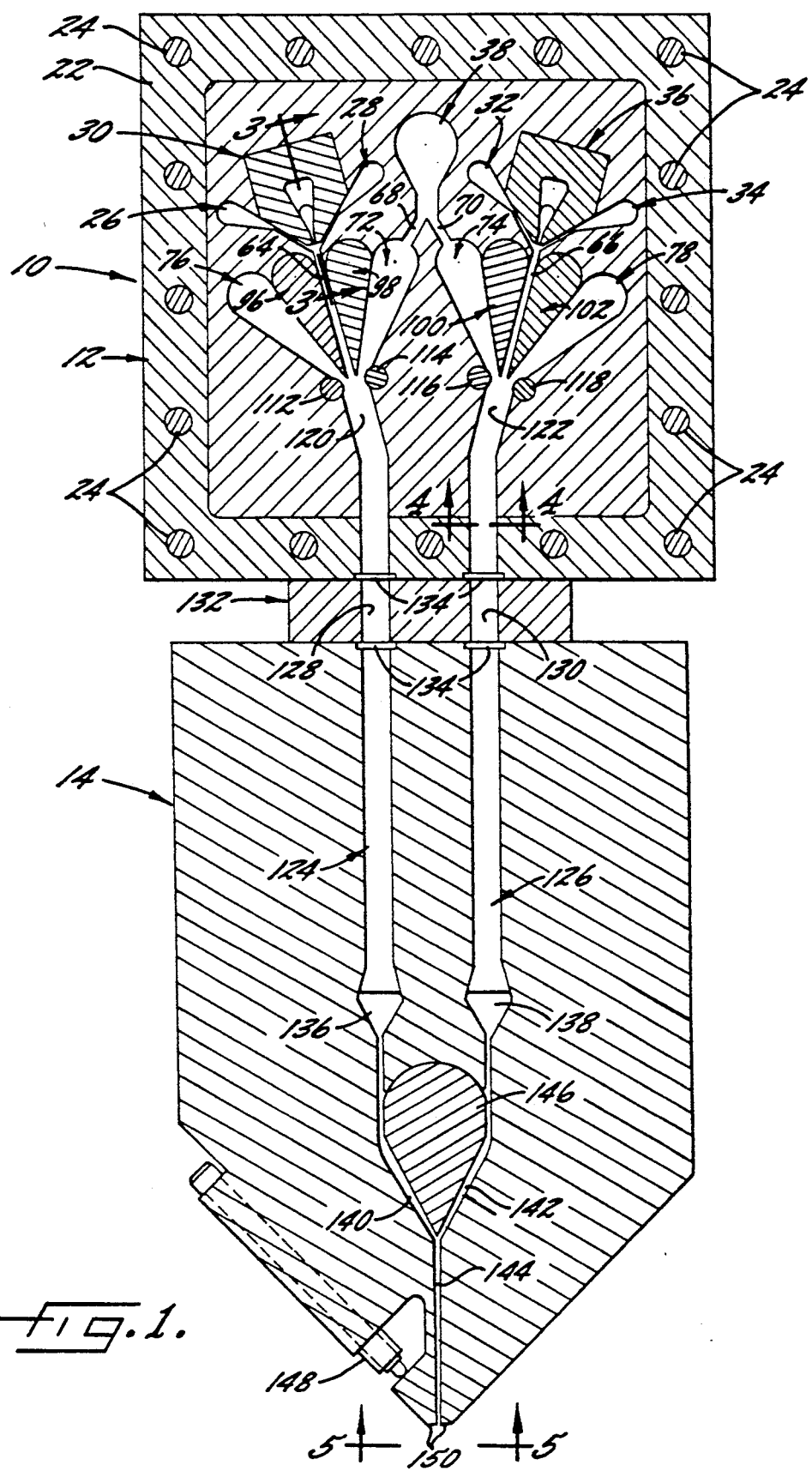
FIG. 1 is a longitudinal cross-sectional view of a preferred embodiment of a coextrusion apparatus useful in carrying out the process of the present invention.

Referring to FIG. 1, a preferred embodiment of a coextrusion apparatus 10 useful in the unique process of the present invention, is shown. The apparatus includes a ten-layer feedblock 12 and a dual manifold die 14.

Figure 2:
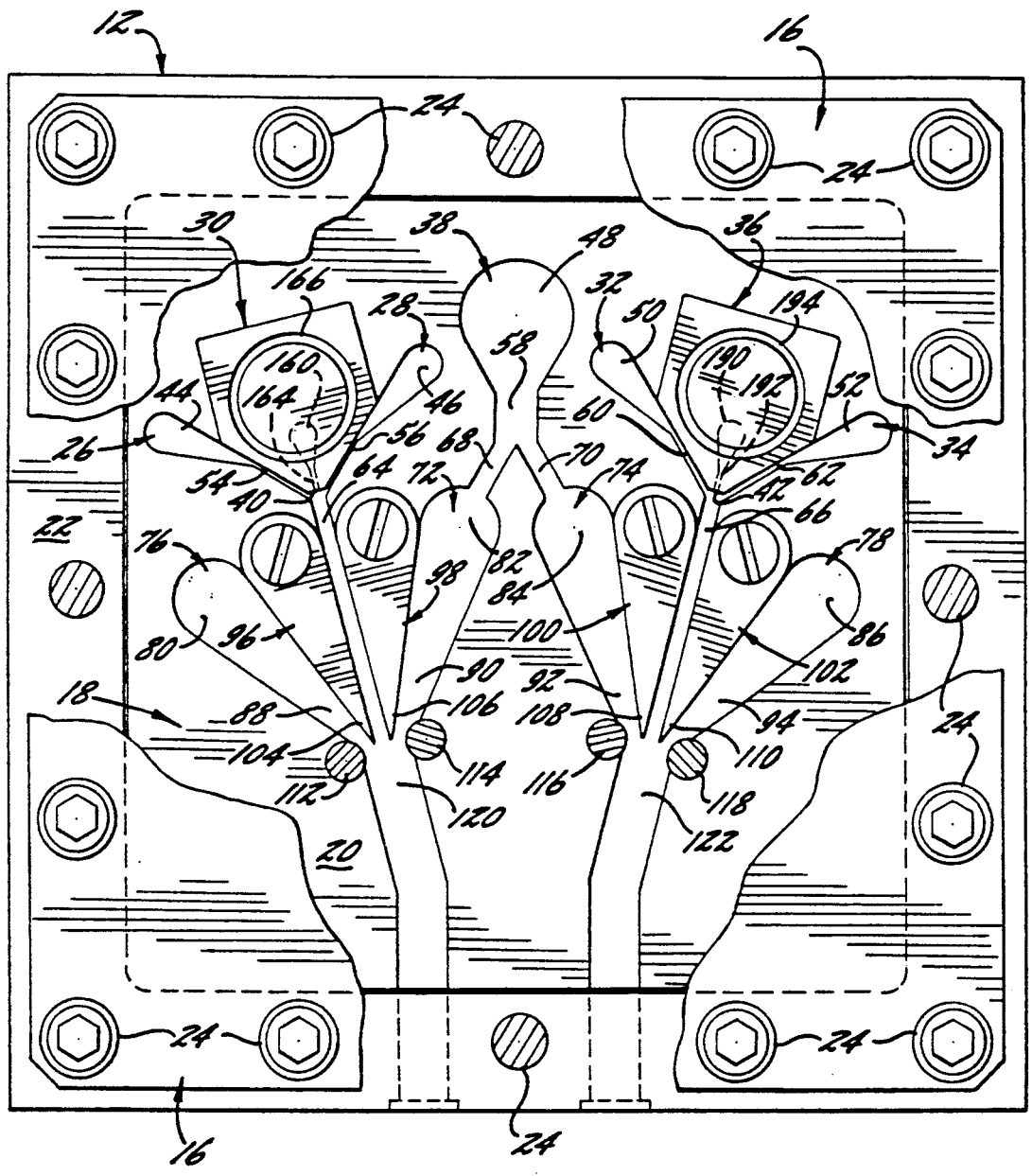
FIG. 2 is an enlarged plan view with portions of a housing plug removed, of the feedblock of the coextrusion apparatus of FIG. 1.

With reference to FIG. 2, portions of a housing plug 16 are broken away to expose surface features of feedblock 12 to view. Revealed is a recess 18 having a bottom wall 20, in a main body 22 of the feedblock. The housing plug is bolted to the main body of the feedblock by bolts 24.

Referring also to FIG. 1, in main body 22 of the feedblock are upstream flow channels 26,28, between which a die 30 is mounted, and are upstream flow channels 32,34, between which a second die 36 is mounted. Centrally disposed in the main body of the feedblock and between dies 30,36 is an upstream flow channel 38. Feed channels for upstream flow channels 26,28,32,34,38 are not shown.

Transverse flow occurs in dies 30,36, which are advantageously removably mounted. Removable dies 30,36 include exit slots 40,42, shown in FIG. 2, through which a stream flows from its respective die.

With reference particularly to FIG. 2, each upstream flow channel includes a manifold 44,46,48,50,52 and a land channel 54,56,58,60,62, as shown. Transverse flow of a stream occurs in a flow channel manifold. The diminished cross-section of a land channel vis-a-vis its manifold, restricts flow, thus providing for the transverse flow.

The flow from upstream flow channels 26,28 and from die 30 converges in a side flow channel 64, and the flow from upstream flow channels 32,34 and from die 36 converges in a side flow channel 66.

The land channel of upstream flow channel 38 divides to form secondary channels 68,70, which serve as feed channels for downstream flow channels 72,74, respectively. Also located downstream are downstream flow channels 76,78, for which feed channels are not shown. Each downstream flow channel includes a manifold 80,82,84,86, in which transverse flow occurs, and a tapered flow-restriction channel 88,90,92,94, as shown.

Situated between downstream flow channel 76 and side flow channel 64, between side flow channel 64 and downstream flow channel 72, between downstream flow channel 74 and side flow channel 66, and between side flow channel 66 and downstream flow channel 78 are pivotably mounted, vane blades 96,98,100,102, as shown. Advantageously, the vane blades are externally adjustable for variably adjusting flow channel geometry.

Near tips 104,106,108,110 of the vane blades are removably mounted, distribution pins 112,114,116,118, which serve downstream flow channels 76,72,74,78, respectively, as necessary.

Immediately downstream of vane blades 96,98, side flow channel 64 converges with downstream flow channels 72,76 to form a feedblock exit passage 120, and immediately downstream of vane blades 100,102, side channel 66 converges with downstream flow channels 74,78 to form a feedblock exit passage 122.

As shown in FIG. 1, feedblock exit passages 120,122 communicate with flow channels 124,126 of dual manifold die 14 via channels 128,130 of a die plate 132. Conventional seals 134 are disposed at the channel junctions.

With reference only to FIG. 1, flow channels 124,126 include manifolds 136,138, and downstream thereof, tapered flow restriction channels 140,142, as shown, which converge to form a die exit channel 144. Thinning and spreading, that is, transverse flow, takes place in the die manifolds.

Disposed between flow restriction channels 140,142 is a pivotably mounted vane blade 146. Dual manifold die 14 includes a conventional device 148 for adjusting the gap of die lips 150.

Figure 3:
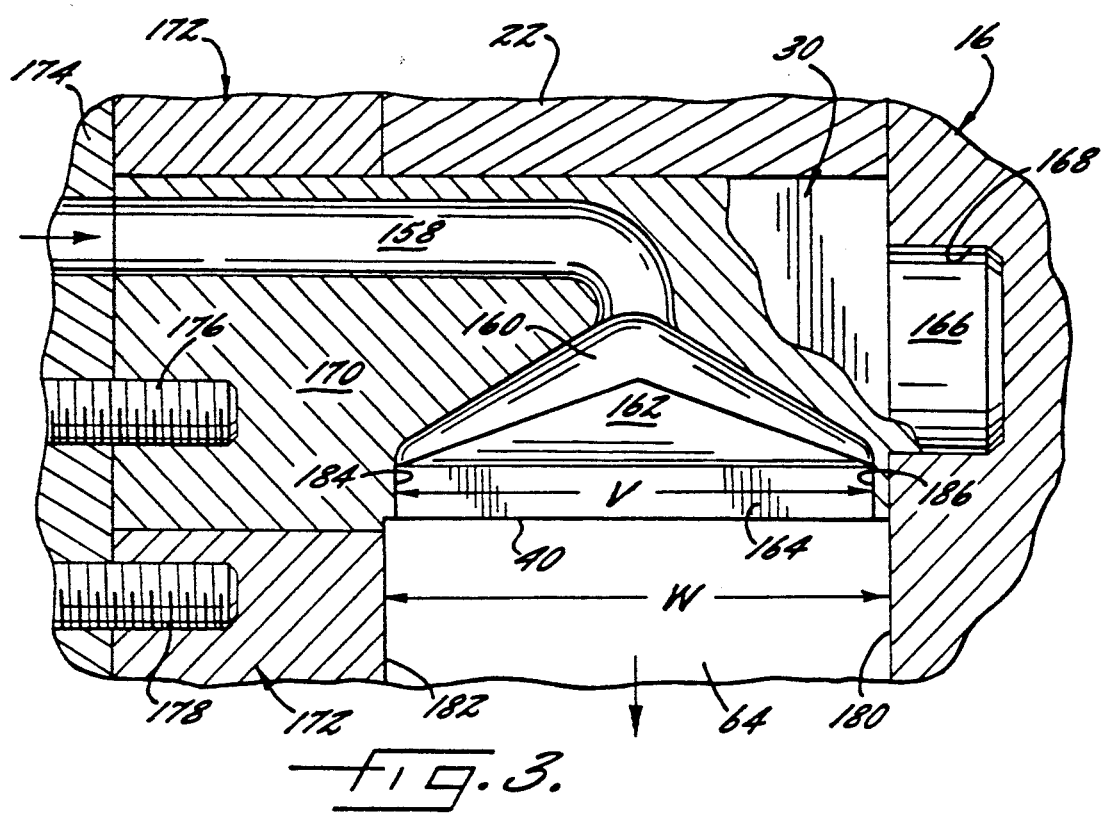
FIG. 3 is an enlarged partial cross-sectional view taken along line 3—3 of FIG. 1, of a barrier die and a side flow channel, downstream thereof.

Referring now to FIG. 3, removable die 30 advantageously has a streamlined flow passage that includes a die inlet channel 158, a manifold 160, preferably of the coat-hanger type, a preland channel 162, and a die exit or land channel 164, which suitably, as shown in FIG. 1, has parallel walls. The length and gap of the die land channel are selected to ensure uniform transverse distribution of a stream as it enters the die land channel. The die land channel terminates in exit slot 40.

Suitably, exit slot 40 of die 30 is of rectangular cross-section. When a polymer having a high resistance to flow relative to polymers flowing through upstream channels 26,28, is passed through die 30, it may be advantageous to provide a heavy edge flow of the high viscosity polymer from the die so as to achieve uniform lateral distribution through downstream manifold 136 of the dual manifold die 14, shown in FIG. 1. A heavy edge flow may be achieved using an exit slot having a relatively larger gap at its ends than between its ends. Polyvinylidene chloride exemplifies a high viscosity polymer.

Unlike the vane blades, which are pivotably mounted, die 30 is preferably fixed in place as now described. A round shaft 166 at an end of the die is supported by a bearing surface 168, which is located in housing plug 16, and an opposite die end 170 is bolted to a housing plug 172 through a flange 174 by bolts 176,178 (only one of each shown). By removal of bolts 178 and by grasping flange 174, the die can be withdrawn from the feedblock.

The rigid mounting of die 30 provides a fixed geometry to the land channels of upstream channels 26,28. Accordingly, a constant proportionality between the land channel output and the die output can be maintained for upstream flow channels 26,28 and die land channel 164.

Inner walls 180,182 of housing plugs 16,172, respectively, define a width W for side flow channel 64. This width is conveniently the same for upstream flow channels 26,28,38, downstream flow channels 72,76 and exit passage 120 of the feedblock. Typically, in the case of a feedblock, this width is 4".

Exit slot 40 has a width V defined by surfaces 184,186 of die land channel 164. As can be seen, this width is less than width W, which, as explained, is conveniently the width of upstream flow channels 26,28. As a consequence, the transversely spread streams exiting from the upstream channels, form a melt-laminate in which a core stream exiting from slot 40, is sandwiched.

Referring again to FIG. 2, die 36 is suitably identical in all respects to die 30. Thus, die 36 has a streamlined internal flow passage that, for instance, includes a coat-hanger type manifold 190 and a land channel 192, which terminates in die exit slot 42; and the die is preferably fixed in place with a round shaft 194 at an end of the die, being supported by a bearing surface (not shown) of housing plug 16.

Likewise, exit slot 42 of die 36 typically has a width identical to that of width V of exit slot 40 of die 30. This width of exit slot 42 is less than the width of upstream flow channels 32,34, which is conveniently W. As a consequence, the transversely spread streams exiting from the upstream flow channels, likewise form a melt-laminate in which a core stream exiting from slot 42, is sandwiched.

Illustratively, when width W is 4", width V may be 3 15/16". A lesser width V may be chosen if relatively wider edges of the sandwich or a relatively less wide core stream is desired. An advantage of removability of dies 30,36 is that each die may be replaced with an interchangeable die having a different width for the exit slot.

If desired, a pair of distribution pins could be employed proximate to the locus of convergence of the streams exiting die land channel 164 and the land channels of upstream flow channels 26,28. As a result, the profile of the converging streams could be influenced. This modification could likewise be used with respect to die land channel 192 and the land channels of upstream flow channels 32,34. Additionally, if desired, each removable die could include a pair of edge seam-forming channels at each end of its exit slot. These modifications are described in U.S. Pat. No. 4,789,513, granted to the inventor.

Operation of apparatus 10 will now be described for coextrusion of a melt-laminate having two EVOH barrier layers. An alternative barrier material could, of course, be chosen, and it will be understood that, if desired, the two barrier layers could be of different barrier materials.

A widely used skin layer material is polypropylene. Polypropylene may be either a homopolymer or a copolymer including, for example, ethylene monomer. Illustrative thermoplastics for use as a skin layer, are olefinic and styrenic polymers. However, it will be understood that any other suitable material could be chosen, with the selection of the material generally being determined by the desired properties of the coextruded laminate.

For sandwiching the barrier layer and providing adhesion of layers, a thermoplastic adhesive compatible with the polypropylene layer is beneficially used. Adhesives of this type are commercially available and will typically include polypropylene copolymers. A suitable thermoplastic non-adhesive could be used with other barrier layer/skin layer combinations.

When EVOH is chosen as the barrier material and polypropylene is selected as the skin layer material, the resultant scrap material will primarily contain these two polymers. Typically, the scrap material will contain particles of EVOH in a polypropylene matrix. For purposes of illustration, a regrind material of such constitution is chosen for use.

Barrier dies 30,36, each having a 3 15/16" wide exit slot, are selected for use and inserted into feedblock 12, which has a width W of 4" for the various flow channels and flow passages.

In operation, molten streams of the adhesive enter upstream flow channels 26,28, undergo transverse flow in manifolds 44,46 to a 4' width, and pass through land channels 54,56. Simultaneously, a molten stream of EVOH enters the streamlined passage of barrier die 30, undergoes transverse flow in the die manifold 160, passes through die exit channel 164, and exits the die through slot 40. In side flow channel 64, these three streams converge to form a melt-laminate of 4" width in which an EVOH stream is sandwiched between a pair of adhesive streams.

Similarly, molten streams of the adhesive enter upstream flow channels 32,34, undergo transverse flow in manifolds 50,52 to a 4" width, and pass through land channels 60,62. At the same time, a molten stream of EVOH enters the streamlined passage of barrier die 36, undergoes transverse flow in barrier die manifold 190, passes through barrier die land channel 192, and exits the die through slot 42. In side flow channel 66, these three streams converge to form a melt-laminate of 4" width in which an EVOH stream is sandwiched between a pair of adhesive streams.

In each instance, a barrier material core stream is isolated within contiguous layers of a pair of streams and is thereby advantageously removed from contact with feedblock walls.

At the same time, a molten stream of a regrind material constituted as earlier described, enters upstream flow channel 38, undergoes transverse flow in manifold 48 to a 4" width, enters land channel 58, and after being divided, passes into feed channels 68,70 of downstream flow channels 72,74.

Thereafter, a portion of the regrind material stream enters downstream flow channel 72, and a molten stream of polypropylene enters downstream flow channel 76. Within the respective manifold of the respective downstream flow channel, each molten stream undergoes transverse flow to a 4" width, and then each stream passes through the respective flow-restriction channel. In feedblock exit passage 120, the streams exiting from downstream flow channels 72,76, converge with the melt-laminate stream exiting from side flow channel 64, to form a five layer, melt-laminate.

Vane blades 96,98 are pivotably adjusted as needed to control flow velocity in channels 76,64,72. Likewise, distribution pins 112,114 are rotatably adjusted as needed.

Figure 4:
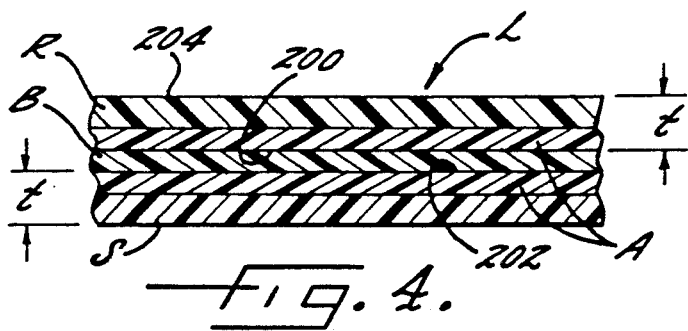
FIG. 4 is an exaggerated partial cross-sectional view of a melt-laminate in a feedblock exit passage, taken substantially along line 4—4 of FIG. 1.

In like fashion, an identical five layer, melt-laminate L is produced in exit passage 122. As shown in FIG. 4, melt-laminate L has a barrier material B disposed between contiguous streams A,A, with which it forms interfaces 200,202; and this three layer, melt-laminate is disposed between wall-contacting streams R and S. Regrind stream R has a wall-contacting surface or face 204. If desired, melt-laminate L could differ from the five layer, melt-laminate produced in exit passage 120, both in layered structure and, for instance, in the barrier material selected.

As can be seen, the barrier material stream is conveniently centrally located within melt-laminate L. Streams R,A and streams S,A are each of beneficially greater thickness than, say about 2-4 times, barrier material stream B. On each side of the barrier material, the melt-laminate has a protective thickness t sufficient to dispose the barrier material stream away from the respective high shear region. As a result, instability of interfaces 200,202 due to a barrier material of relatively higher viscosity than that of a die wall-contacting material is overcome during flow of the melt-laminate through die manifold 138. The protective thickness may be, as shown, the same on each side of the barrier stream, or may be different from one side to the other.

As also can be understood, regrind stream R is separated from skin layer-forming stream S by barrier material stream B. Separation of these two streams avoids an interface formed by streams of sufficient similarity that EVOH particle migration into or though the interface may occur, and consequently prevents the applesauce effect.

These five layer, melt-laminates thereafter pass into dual manifold die 14, where each is spread and thinned in its respective flow channel manifold to a width of, for instance, 48". Thereafter, regrind stream face 204 of five layer, melt-laminate L converges in die exit channel 144 with the like regrind stream face of the five layer, melt-laminate exiting from flow restriction channel 140, to form a layered composite stream having two barrier layers between which regrind is disposed.

Accordingly, the process of the present invention is able to provide a coextruded laminate that includes a barrier layer superimposed over another barrier layer. As there is a low probability of overlapping imperfections in the barrier layers, the resultant laminate has a barrier of higher integrity than that provided by a single barrier layer.

Figure 5:
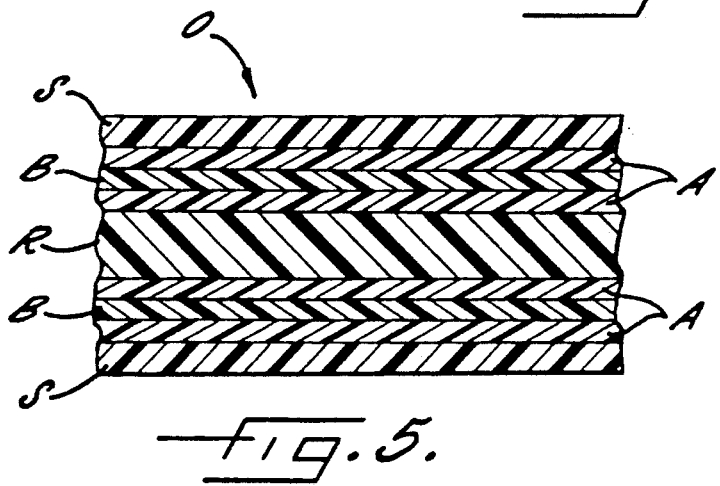
FIG. 5 is an exaggerated partial cross-sectional view of a layered composite stream as it exits the dual manifold die of the coextrusion apparatus of FIG. 1, taken substantially along line 5—5 of FIG. 1.

FIG. 5 depicts a nine layer, coextruded laminate 0, which has a regrind layer R, shown as a single layer, disposed between two barrier layers B,B, and in which a barrier layer separates regrind layer R from each skin layer S. Each barrier layer is sandwiched between a pair of adhesive layers.

Beneficially, a container made from laminate 0 would protect a food product from organoleptic contamination even when approximately 60 volume percent of the laminate is regrind layer R, because the regrind layer is disposed between a pair of barrier layers.

Having described the invention in detail and by reference to a preferred embodiment thereof, it will be apparent that modifications and variations are possible without departing from the scope of the invention defined in the appended claims. Several changes or modifications have been briefly mentioned for purposes of illustration.

I claim:

1. A coextrusion process comprising providing a first regrind stream and a second regrind stream; converging a first barrier material stream with said first regrind stream and converging said first barrier material stream with a first skin layer-forming stream to form a first composite stream having said first barrier material stream disposed between a first protective stream comprising said first regrind stream, and a second protective stream comprising said first skin layer-forming stream, said first protective stream and said second protective stream each being of sufficient thickness to overcome interfacial instability of said first barrier material stream during thinning and spreading of said first composite stream, and said first protective stream having a face uncovered by another stream; converging a second barrier material stream with said second regrind stream and converging said second barrier material stream with a second skin layer-forming stream to form a second composite stream having said second barrier material stream disposed between a third protective stream comprising said second regrind stream, and a fourth protective stream comprising said second skin layer-forming stream, said third protective stream and said fourth protective stream each being of sufficient thickness to overcome interfacial instability of said second barrier material stream during thinning and spreading of said second composite stream, and said third protective stream having a face uncovered by another stream; thereafter thinning and spreading said first composite stream and thinning and spreading said second composite stream; and thereafter converging said uncovered face of said first protective stream of said first composite stream with said uncovered face of said third protective stream of said second composite stream to form a third composite stream containing said first and second barrier material streams, having said first and second regrind streams disposed between said first and second barrier material streams, and having said first and second regrind streams separated from said first and second skin layer-forming streams.

2. The coextrusion process of claim 1, wherein said first regrind stream comprises a first material in a matrix of a second material of sufficient similarity to said first skin layer-forming stream that if said first skin layer-forming stream were adjacent to said first regrind stream, said first material could migrate into or through the interface between said adjacent streams.

3. The coextrusion process of claim 1, wherein said first protective stream further comprises an adhesive or non-adhesive material stream, and wherein said third protective stream further comprises an adhesive or non-adhesive material stream.

4. The coextrusion process of claim 1, wherein said first and second barrier material streams are the same, and consist of EVOH.

5. The coextrusion process of claim 1, wherein said first and second skin layer-forming streams are the same, and consist of polypropylene, which may be a copolymer.

6. The coextrusion process of claim 2, wherein said first material is EVOH, and said second material is polypropylene.

7. The coextrusion process of claim 3, wherein said uncovered face of said first protective stream is that of said first regrind stream, and said uncovered face of said third protective stream is that of said second regrind stream.

8. The coextrusion process of claim 1, wherein said first barrier material stream is of relatively higher viscosity than said first skin layer-forming stream and said first regrind stream, and wherein said second barrier material stream is of relatively higher viscosity than said second skin layer-forming stream and said second regrind stream.

9. The coextrusion process of claim 1, further comprising passing said first regrind stream through a channel portion formed by an adjustable divider and a rotatably adjustable element, prior to effecting said converging of said first barrier material stream with said first regrind stream.

10. The coextrusion process of claim 1, further comprising passing said first barrier material stream directly into a flow channel formed by a pair of adjustable surfaces, prior to effecting said converging of said first barrier material stream with said first skin layer-forming stream.

11. The coextrusion process of claim 1, wherein said first and second regrind streams constitute at least about 30 to 35 volume % of said third composite stream.

12. A coextrusion process comprising providing a first regrind stream and a second regrind stream; converging a first barrier material stream with said first regrind stream and converging said first barrier material stream with a first skin layer-forming stream to form a first composite stream having said first barrier material stream disposed between a first protective stream comprising said first regrind stream, and a second protective stream comprising said first skin layer-forming stream, said first barrier material stream being of relatively higher viscosity than said first skin layer-forming stream and said first regrind stream, said first protective stream and said second protective stream each being of sufficient thickness to overcome interfacial instability of said first barrier material stream during thinning and spreading of said first composite stream, and said first regrind stream having a face uncovered by another stream; converging a second barrier material stream with said second regrind stream and converging said second barrier material stream with a second skin layer-forming stream to form a second composite stream having said second barrier material stream disposed between a third protective stream comprising said second regrind stream, and a fourth protective stream comprising said second skin layer-forming stream, said second barrier material stream being of relatively higher viscosity than said second skin layer-forming stream and said second regrind stream, said third protective stream and said fourth protective stream each being of sufficient thickness to overcome interfacial instability of said second barrier material stream during thinning and spreading of said second composite stream, and said second regrind stream having a face uncovered by another stream; thereafter thinning and spreading said first composite stream and thinning and spreading said second composite stream; and thereafter converging said uncovered face of said first regrind stream of said first composite stream with said uncovered face of said second regrind stream of said second composite stream to form a third composite stream in which said first and second regrind streams constitute at least about 30 to 35 volume %, said third composite stream containing said first and second barrier material streams, having said first and second regrind streams disposed between said first and second barrier material streams, and having said first and second regrind streams separated from said first and second skin layer-forming streams.

13. The coextrusion process of claim 12, wherein said first regrind stream comprises a first material in a matrix of a second material of sufficient similarity to said first skin layer-forming stream that if said first skin layer-forming stream were adjacent to said first regrind stream, said first material could migrate into or through the interface between said adjacent streams.

14. The coextrusion process of claim 12, wherein said first and second barrier material streams are the same, and consist of EVOH.

15. The coextrusion process of claim 12, wherein said first and second skin layer-forming streams are the same, and consist of polypropylene, which may be a copolymer.

16. The coextrusion process of claim 13, wherein said first material is EVOH, and said second material is polypropylene.

17. The coextrusion process of claim 12, further comprising passing said first regrind stream through a channel portion formed by an adjustable divider and a rotatably adjustable element, prior to effecting said converging of said first barrier material stream with said first regrind stream.

18. The coextrusion process of claim 12, further comprising passing said first barrier material stream directly into a flow channel formed by a pair of adjustable surfaces, prior to effecting said converging of said first barrier material stream with said first skin layer-forming stream.

* * * * *